United States Patent
Agasar et al.

(10) Patent No.: US 12,248,433 B1
(45) Date of Patent: Mar. 11, 2025

(54) METHOD AND APPARATUS FOR SNAPSHOT MANAGEMENT

(71) Applicant: Dell Products L.P., Round Rock, TX (US)

(72) Inventors: Mahadev Agasar, Rabkavi (IN); Hemanth Dasan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/512,444

(22) Filed: Nov. 17, 2023

(51) Int. Cl.
*G06F 16/11* (2019.01)
*G06F 16/17* (2019.01)

(52) U.S. Cl.
CPC ........ *G06F 16/128* (2019.01); *G06F 16/1727* (2019.01); *G06F 16/1734* (2019.01)

(58) Field of Classification Search
CPC ............... G06F 16/128; G06F 16/1727; G06F 16/1734
See application file for complete search history.

(56) References Cited

U.S. PATENT DOCUMENTS

| 10,936,437 | B1* | 3/2021 | Santos | G06F 11/1469 |
| 2009/0144518 | A1* | 6/2009 | Lewis | G06F 3/0608 |
| | | | | 711/170 |
| 2022/0066882 | A1* | 3/2022 | Wang | G06F 12/0253 |
| 2022/0229805 | A1* | 7/2022 | Chakeres | G06F 16/27 |

\* cited by examiner

*Primary Examiner* — Jay A Morrison
(74) *Attorney, Agent, or Firm* — Daly, Crowley, Mofford & Durkee, LLP

(57) ABSTRACT

A method for use in a storage system, comprising: identifying snapshot storage space consumption information that corresponds to a snapshot storage space; identifying a snapshot management metric that is associated with the snapshot storage space, the snapshot management metric being identified based on the snapshot storage space consumption information; and outputting an indication of the snapshot management metric for presentation to a user.

20 Claims, 7 Drawing Sheets

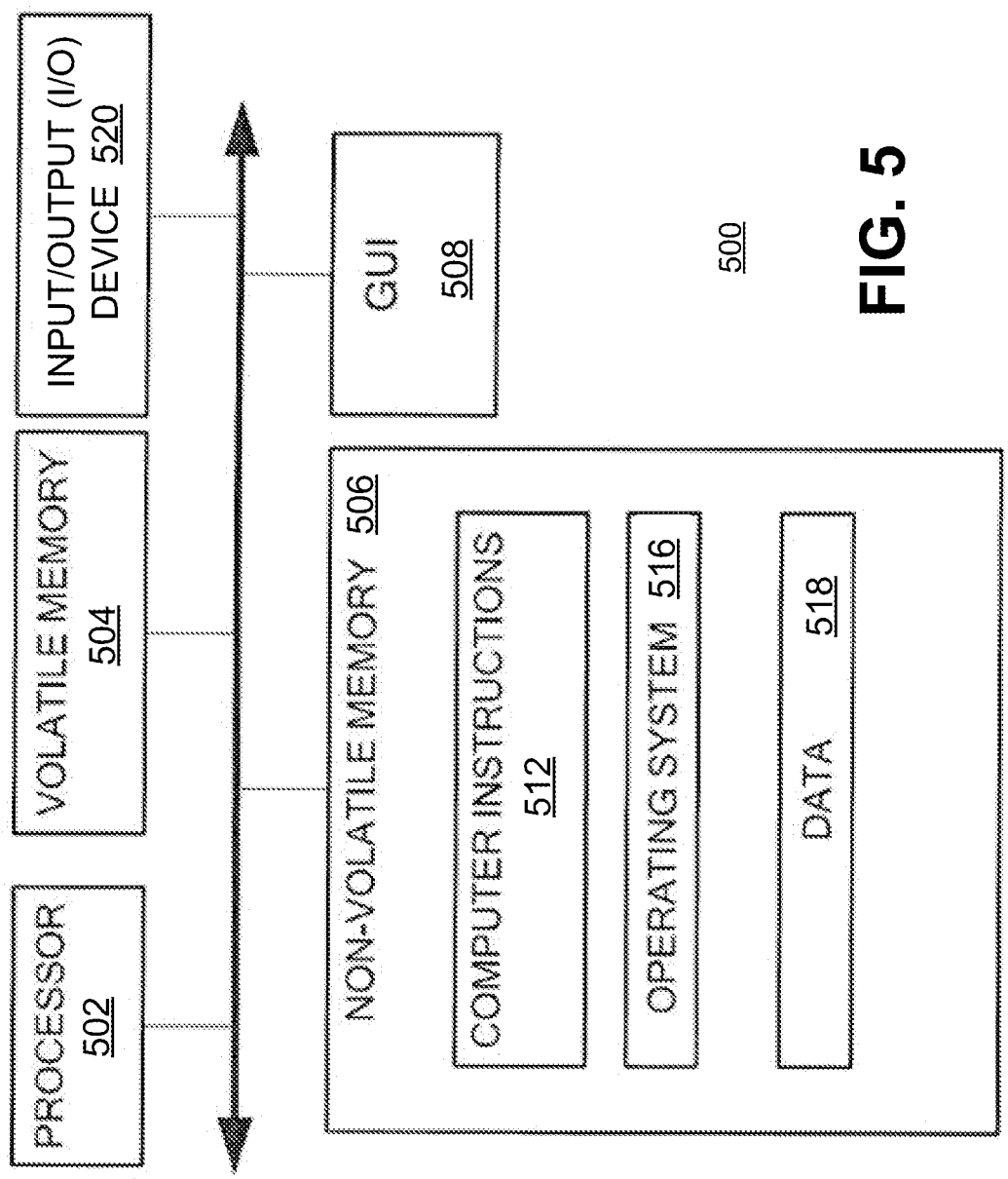

METHOD AND APPARATUS FOR SNAPSHOT MANAGEMENT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, comprising: identifying snapshot storage space consumption information that corresponds to a snapshot storage space; identifying a snapshot management metric that is associated with the snapshot storage space, the snapshot management metric being identified based on the snapshot storage space consumption information; outputting an indication of the snapshot management metric for presentation to a user.

According to aspects of the disclosure, a system is provided, comprising: a memory; and at least one processor that is operatively coupled to the memory, the at least one processor being configured to perform the operations of: identifying snapshot storage space consumption information that corresponds to a snapshot storage space; identifying a snapshot management metric that is associated with the snapshot storage space, the snapshot management metric being identified based on the snapshot storage space consumption information; and outputting an indication of the snapshot management metric for presentation to a user.

According to aspects of the disclosure, a non-transitory computer-readable medium is provided that stores one or more processor-executable instructions, which, when executed by one or more processors, cause the one or more processors to perform the operations of: identifying snapshot storage space consumption information that corresponds to a snapshot storage space; identifying a snapshot management metric that is associated with the snapshot storage space, the snapshot management metric being identified based on the snapshot storage space consumption information; and outputting an indication of the snapshot management metric for presentation to a user.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 5 is a diagram of an example of a computing device, according to aspects of the disclosure.

DETAILED DESCRIPTION

Figure 1:
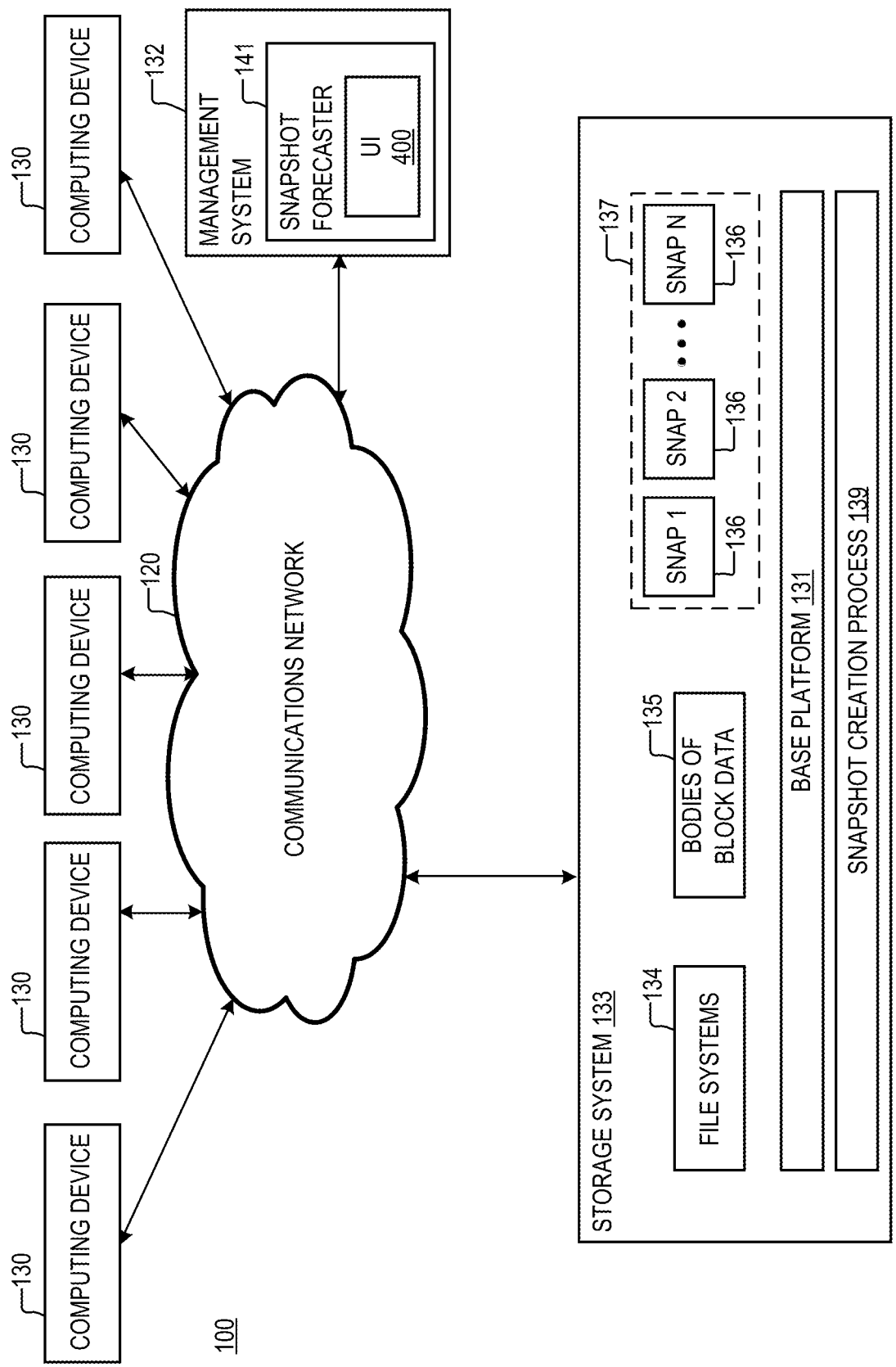
FIG. 1 is a diagram of an example of a system, according to aspects of the disclosure.

In the realm of data storage, user data is of paramount importance, and ensuring the availability of backups is crucial for mitigating the impact of disasters or data corruption incidents. Snapshot and remote replication services play a pivotal role in fulfilling this need. However, the need for uninterrupted operation of snapshot and replication backups has become increasingly critical, given the unpredictable nature of potential disasters, data corruption, and their association with hardware, software, and network issues. Customers who employ a substantial number of storage groups (SGs), devices, or filesystems with regular or scheduled snapshot configurations may rapidly deplete the storage space allocated for metadata used by local replication/backup. This can lead to performance degradation or even catastrophic system failures, especially when numerous concurrent snapshot schedules are in operation. An objective of the present disclosure is to ensure continuous and reliable snapshot creation while keeping users (e.g., system administrators) well-informed about the state of snapshot activities. By providing users with access to detailed snapshot statistics, we empower them to proactively prevent data loss, data unavailability, and system outages.

A storage system may be specifically designed to handle mid to large-scale block and filesystem data requirements, and it may offer support for both local and remote backups to ensure data access even in disaster scenarios. Local backups, in the form of snapshots, have become an integral component of storage systems. In general, the snapshots in a storage system may be stored in a snapshot reserved space—i.e., a space that is reserved for (and/or exclusively dedicated to) the storage of snapshots. As the usage of snapshots continues to grow over time, driven by snapshot schedules and manual creations for both block and filesystem objects, it is anticipated that the reserved snapshot storage space may reach its upper utilization limit or become completely filled due to these schedules and manual operations.

Many conventional storage systems lack mechanisms in place to forecast or visualize information and statistics related to block and file snapshots. This lack of insight hinders system administrators' ability to proactively manage potential impacts such as reduced system performance, snapshot creation failures, system disruptions, data unavailability, and data loss situations. To address this challenge, a snapshot forecaster 141 is provided that implements various mechanisms for retrieving and generating the necessary information and statistics to better control these potential risks.

An example of one possible implementation of snapshot forecaster 141 is discussed further below with respect to FIGS. 1-5. Snapshot forecaster 141 is a utility tool designed for the administration of storage systems. One of its key functionalities is providing a forecasting mechanism for snapshots, which is valuable in the managing storage systems. Additionally, snapshot forecaster 141 offers early predictions regarding snapshot storage space utilization. It also serves as a comprehensive solution for displaying complete snapshot statistics, covering both block snapshots and file system snapshots.

Snapshot forecaster 141 offers several notable advantages. For instance, it provides a convenient means to access information on both block and file snapshots while preventing performance issues stemming from excessive snapshot space usage. Moreover, the use of snapshot forecaster 141 mitigates the risk of system failures or malfunctions, especially when dealing with a large number of devices configured within a customer's storage system. It further reduces the likelihood of making assumptions about delayed or missed snapshots due to upgrades or other factors, thereby safeguarding against data loss. Snapshot forecaster 141 also keeps system administrators informed about upcoming, exceptional, and/or postponed snapshots, assisting them in scheduling activities based on forecasted snapshot statistics. This versatile tool can be employed in any storage system that incorporates snapshots as part of its data protection mechanisms.

FIG. 1 is a diagram of an example of a system 100, according to aspects of the disclosure. As illustrated, system 100 may include a storage system 133 that is coupled to a plurality of computing devices 130 and a management system 132 via a communications network 120. Storage system 133 may include a plurality of computing devices, such as the computing device 500, which is discussed further below with respect to FIG. 5. Each of the computing devices 130 may include a smartphone, a desktop, a laptop, and/or any other device that might be used by a user to store and retrieve data from storage system 133. The communications network 120 may include one or more of the Internet, a local area network (LAN), a wide area network (WAN), an InfiniBand network, a mobile data network, etc.

Management system 132 may include a computing system that is used by a system administrator to manage storage system 133. In some implementations, the management system 132 may include one or more computing devices, such as the computing device 500 which is discussed further below with respect to FIG. 5. The management system 132 may be configured to execute a snapshot forecaster 141. In some implementations, the snapshot forecaster 141 may be configured to execute a user interface (UI) 400, which is discussed further below with respect to FIG. 4. Additionally or alternatively, in some implementations, the snapshot forecaster 141 may be configured to execute a process 200A, which is discussed further below with respect to FIG. 2A.

Optionally, storage system 133 may be configured to implement a large number of file systems 134. In some practical applications, the file systems 134 may number in the hundreds or even thousands. Furthermore, the storage system 133 may store a plurality of bodies of data 135. Each body of data 135 may include data blocks that are used in a different external file system. In some practical applications, the bodies of data may number in the hundreds or even thousands. The storage system 133 may store a plurality of snapshots 136. Each of the snapshots may be a snapshot of one of the file systems 134 or a snapshot of one of the bodies of data 135. In many practical applications, the snapshots 136 may number in the thousands or even hundreds of thousands. The snapshots 136 may be stored in a snapshot storage space 137 that has been allocated for the storage of snapshots. A base platform 131 may be configured to allocate the snapshot storage space 137 and provide Application Programming Interfaces (APIs) for the management of the storage space 137. For example, the APIs may include one or more APIs that return various types of statistics related to the usage of snapshot storage space 137. As another example, the APIs may include one or more APIs that return upgrade information. In some implementations, storage system 133 may execute a process 139. Process 139 may include one or more processes that are tasked with the creation of snapshots.

Figure 2A:
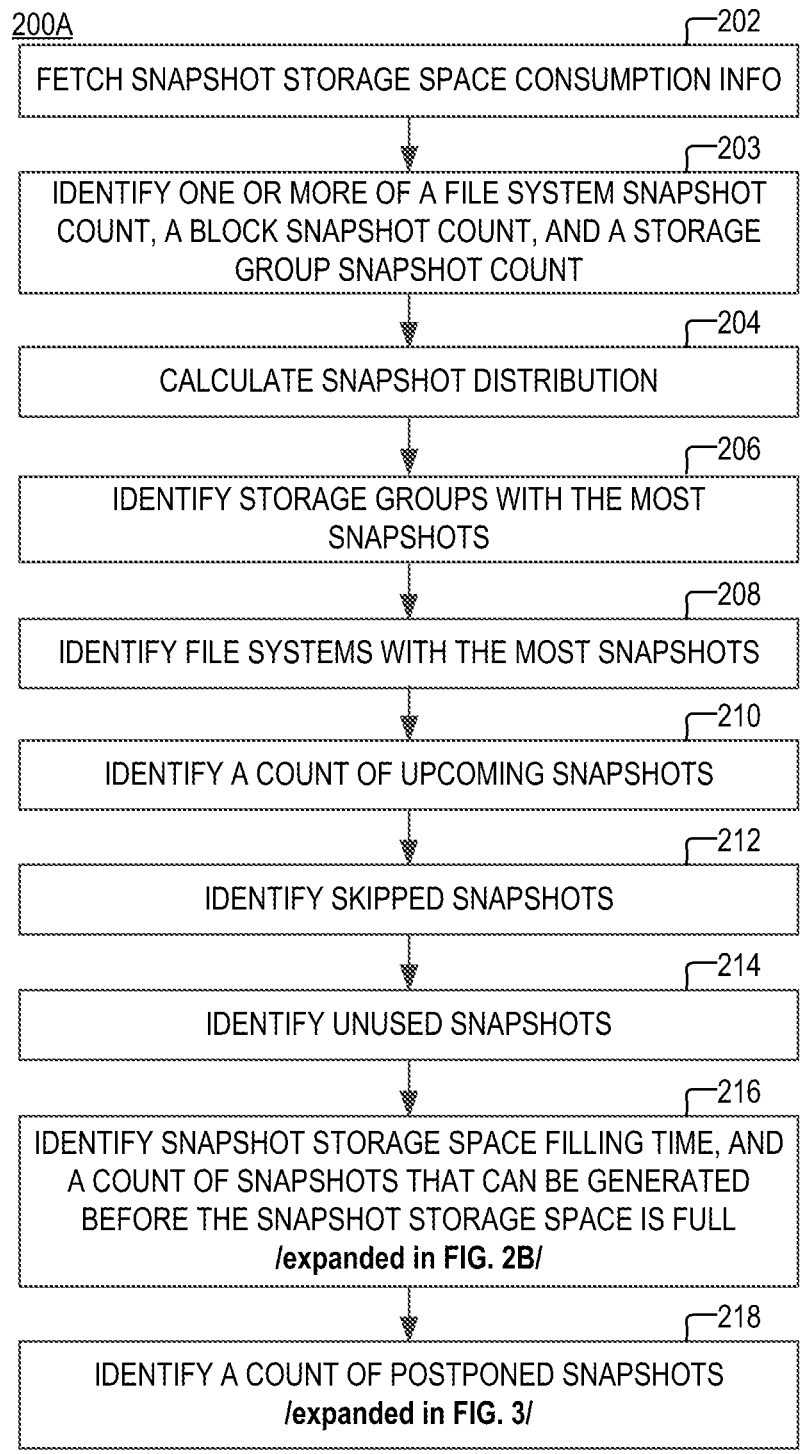
FIG. 2A is a flowchart of an example of a process, according to aspects of the disclosure.

FIG. 2A is a flowchart of an example of a process 200A, according to aspects of the disclosure. According to the present example, process 200A is performed by the snapshot forecaster 141 (and/or management system 132). However, the present disclosure is not limited to any specific entity or set of entities performing the process 200A.

At step 202, snapshot forecaster 141 fetches snapshot storage space consumption information. According to the present example, fetching the consumption information includes one or more of:
(i) detecting a size of the snapshot storage space 137,
(ii) identifying a how much of the snapshot storage space 137 is currently being used to store existing snapshots,
(iii) identifying how much of snapshot storage space 137 is currently free and available to store snapshots that would be created in the future,
(iv) identifying all block snapshots that are currently stored in snapshot storage space 137,
(v) identifying all file system snapshots that are currently stored in snapshot storage space 137,
(vi) identifying one or more snapshot creation policies,
(vii) identifying one or more snapshot expiration policies,
(viii) identifying one or more storage groups in storage system 133,
(ix) identifying any other suitable information related snapshots that are stored or would be stored in snapshot storage space 137.

In some implementations, the snapshot forecaster 141 may obtain the consumption information by placing one or more API calls to base platform 131. It will be understood that the list of items that can be obtained at step 202 is provided as an example. In general, at step 202, snapshot forecaster 141 may retrieve any information that is directly or indirectly related to the generation of snapshot and/or the usage of snapshot storage space 137. In some implementations, snapshot forecaster 141 may retrieve any information that is necessary for the metrics that are discussed further below with respect to steps 203-218.

At step 203, snapshot forecaster 141 determines one or more of: (i) a count of file system snapshots that are stored in snapshot storage space 137, (ii) a count of block snapshots that are stored in storage space 137, and (iii) a count of storage group snapshots that are storage space 137. In some implementations, step 203 may be performed by consolidating information about the snapshots in storage space 137 that is obtained at step 202.

As used herein, the term "snapshot creation policy" may refer to a rule or a set of rules that specify when or under what circumstances a snapshot associated with the snapshot creation policy must be created. The snapshot associated with the policy may be a snapshot of a file system, a snapshot of a body of data blocks, or a snapshot of a storage group. In general, each file system, each body of block data, and each storage group may be associated with one or more snapshot creation policies that are specific to it. In this regard, in many practical applications, the snapshot creation policies that are in force at storage system 133, at any given time, may number in the hundreds or even thousands, which makes it hard to keep track of what is done by which policy. As discussed further below, snapshot forecaster 141 may enable system administrators to keep track of the effects of different snapshot creation policies that are currently in force at storage system 133 (e.g., effects on the usage of snapshot storage space 137), and provide system administrators with a unified view of those effects. Throughout the disclosure, the terms "snapshot creation policy" and "snapshot schedule" are used interchangeably.

As used herein, the term "snapshot expiration policy" may refer to a rule or a set of rules that specify when or under what circumstances a snapshot associated with the snapshot expiration policy must be deleted. The snapshot associated with the policy may be a snapshot of a file system, a snapshot of a body of data blocks, or a snapshot of a storage group. In general, each file system, each body of block data, and each storage group may be associated with one or more snapshot expiration policies that are specific to it. In this regard, in many practical applications, the snapshot expiration policies that are in force at storage system 133, at any given time, may number in the hundreds or even thousands, which makes it hard to keep track of what is done by which policy. As discussed further below, snapshot forecaster 141 may enable system administrators to keep track of the effects of different snapshot expiration policies that are currently in force at storage system 133 (e.g., effects on the usage of snapshot storage space 137), and provide system administrators with a unified view of those effects. As is known in the art, the term "storage group" refers to a plurality of file systems that are snapped together—i.e., file systems whose data is preserved in the same snapshot (rather than being preserved in different snapshots).

At step 204, snapshot forecaster 141 calculates a snapshot distribution for the snapshot storage space 137. The snapshot distribution may be calculated based on at least some of the storage space consumption information that is obtained at step 202. According to the present example, the snapshot distribution is equal to (or otherwise based on) the ratio of the count of file system snapshots and the count of block snapshots that are currently stored in snapshot storage space 137. In some implementations, the ratio may be obtained by dividing the count of block snapshots by the count of file system snapshots, or vice versa. Additionally or alternatively, in some implementations, the ratio may be obtained by dividing the sum of file system and storage group snapshots in storage space 137 by the count of block snapshots in storage space 137. In some implementations, the snapshot ratio may include any metric that is indicative of how much of the part of storage space 137 that is currently used to store snapshots is occupied by file system snapshots.

At step 206, snapshot forecaster 141 identifies one or more storage groups with the most snapshots. The storage group with the most snapshots may be identified based on at least some of the consumption information that is obtained at step 202. In some implementations, the one more storage groups with the most snapshots may be identified by identifying each of a plurality of storage groups in storage system 133. The plurality of storage groups may include all storage groups in storage system 133 or only a portion of the storage groups. Next, for each of the storage groups, the snapshot forecaster 141 may identify the count of snapshots for that storage group that are currently stored in snapshot storage space 137. And finally, snapshot forecaster 141 may identify N storage groups that are part of the plurality of storage groups which have the most snapshots stored in snapshot storage space 137, where N is a positive integer, and N>1.

At step 208, snapshot forecaster 141 identifies one or more file systems with the most snapshots. The file system with the most snapshots may be identified based on at least some of the consumption information that is obtained at step 202. In some implementations, the one more file systems with the most snapshots may be identified by identifying each of a plurality of file systems in storage system 133. The plurality of file systems may include all file systems in storage system 133 (e.g., all of file systems 134) or fewer than all of the file systems. Next, for each of the file systems, the snapshot forecaster 141 may identify the count of snapshots for that file system that are currently stored in snapshot storage space 137. And finally, snapshot forecaster 141 may identify N file systems that are part of the plurality of file systems which have the most snapshots stored in snapshot storage space 137, where N is a positive integer, and N>1.

At step 210, snapshot forecaster 141 identifies a count of upcoming snapshots. The count of upcoming snapshots may be the number of snapshots that would be created during a predetermined immediate time period (e.g., in the next 24 hours). In some implementations, the predetermined time period may start at a current time instant and end sometime in the future. In some implementations, the predetermined time period may be specified via a user input (e.g., mouse or keyboard input) that is received at management system 132. The count of upcoming snapshots may be identified by: (i) identifying a first count of storage group snapshots that are expected to be created during the predetermined time period, (ii) identifying a second count of file system snapshots that are expected to be created during the predetermined time period, (iii) calculating the sum of the first count and the second count. In some implementations, snapshot forecaster 141 may also identify a third count of block snapshots that are going to be created during the predetermined time period, in which case the total count of upcoming snapshots may be equal to the sum of the first, second, and third counts.

The first count may be identified by examining each of a plurality of snapshot creation policies that correspond to the file systems and determining how many snapshots would be created under those policies during the predetermined time period. The snapshot creation policies may include all or fewer than all of the snapshot creation policies in storage system 133 that are currently active and govern the creation of file system snapshots. The second count may be identified by examining each of a plurality of snapshot creation policies that correspond to the bodies of block data and determining how many snapshots would be created under those policies during the predetermined time period. The snapshot creation policies may include all or fewer than all of the snapshot creation policies in storage system 133 that are currently active and govern the creation of block snapshots. The third count may be identified by examining each of a plurality of snapshot creation policies that correspond to storage groups and determining how many snapshots would be created under those policies during the predetermined time period. The snapshot creation policies may include all or fewer than all of the snapshot creation policies in storage system 133 that are currently active and govern the creation of storage group snapshots.

At step 212, snapshot forecaster 141 identifies a count of skipped snapshots. Identifying the count of skipped snapshots may include identifying a predetermined past time period. The past predetermined time period may start sometime in the past and end at a current time instant. Alternatively, the predetermined time period may end in the past. In some implementations, the predetermined time period may be specified via a user input (e.g., mouse or keyboard input) that is received at management system 132. To perform step 212, snapshot forecaster 141 may identify the snapshot creation policies (or schedules) that control the creation of snapshots of each of the plurality of storage groups (identified at step 206). Next, snapshot forecaster 141 may identify the snapshot creation policies (or schedules) that control the creation of snapshots of each of the plurality of file systems (identified at step 208). Next, snapshot forecaster 141 can process the snapshot creation policies of the plurality of storage groups and the plurality of file systems to determine a first count (i.e., the total count) of snapshots that were required to be created by those policies during the predetermined window. Next, snapshot forecaster 141 may detect a second count of snapshots for any of the plurality of storage groups and any of the plurality of file systems that currently are present in snapshot storage space 137. The second count may identify the total number of snapshots that were created during the predetermined period for each of the plurality of storage groups and each of the plurality of file systems. In some implementations, the second count may be equal to the number of snapshots that are created as a result of executing the same set of snapshot creation policies that is used to determine the first count. And finally, snapshot forecaster 141 may subtract the second count from the first count to determine the count of skipped snapshots.

In some implementations, snapshot forecaster 141 may examine relevant expiration policies to identify any snapshots that were required to be created during the predetermined time period, and which would also have expired during the predetermined time period. In such implementations, snapshot forecaster 141 may deduct the count of these snapshots from the difference between the first count and the total count, to arrive at a more accurate estimate of the total number of skipped snapshots. In some implementations, a "snapshot" is considered missing or postponed only if the snapshot is not supposed to be expired by any expiration rule in the storage system 133 before the end of the upgrade period.

In other words, the count of skipped snapshots may identify the number of snapshots that weren't created during the predetermined period, even though they were supposed to (as required by the snapshot creation policies). A snapshot may fail to be created due to a hardware or software failure, system overload, and/or any other reason. The count of skipped snapshots that is identified at step 212 may include a first count of skipped file system snapshots, a second count of skipped block snapshots, a third count of skipped storage group snapshots, or the sum of two or more of the first, second, and third counts.

At step 214, snapshot forecaster 141 identifies one or more old unused snapshots. To perform step 214, snapshot forecaster 141 may identify the snapshots in snapshot storage space 137 which have been stored in snapshot storage space 137 for longer than a predetermined threshold duration (e.g., longer than 1 year). The identified snapshots are herein referred to as "old snapshots". In some implementations, the threshold duration may be specified via user input (e.g., a keyboard or mouse input) that is received at management system 132. Next, for each of the identified snapshots, snapshot forecaster 141 may determine how many times this snapshot has been used to perform a restore operation. Next, snapshot forecaster 141 identifies which ones of the old snapshots have been used in fewer than a predetermined number of restore operations. In some implementations, the threshold number of restore operations may be specified via user input (e.g., a keyboard or mouse input) that is received at management system 132. The old snapshots that have been used in fewer than the predetermined number of restore operations are herein referred to as "unused old snapshots". The term "unused' as applied in the phrase "unused old snapshots" is not intended to imply that the snapshots are not used at all; rather it indicates that the old snapshots are used in less than the specified threshold number of restore operations.

At step 216, snapshot forecaster 141 identifies a snapshot filling time for snapshot storage space 137. In some implementations, identifying the snapshot filling time may include identifying the date and/or hour by which snapshot storage space 137 would become full. Additionally or alternatively, in some implementations, identifying the snapshot filling time may include identifying the number of days and/or hours until snapshot storage space 137 becomes full. Furthermore, at step 216, snapshot forecaster 141 also identifies the number of snapshots that can be generated before storage space becomes full. It is noted that the calculation of the number of remaining snapshots takes into account that some of the snapshots in snapshot storage space 137 would naturally expire as newer snapshots are being created. In some implementations, step 216 may be performed by executing a process 200B, which is discussed further below with respect to FIG. 2B.

At step 218, snapshot forecaster 141 identifies a count of postponed snapshots. As used throughout the disclosure, the term "postponed snapshot" may refer to a snapshot that was required to be created by one or more snapshot creation policies in the storage system 133, and which was not created due to an upgrade that was scheduled to be performed and/or performed in the storage system 133. The term "upgrade" as used herein may refer, at least in part, to a file update such as the replacement and/or modification of a file that is executed by storage system 133. In some implementations, step 218 may be performed by executing a process 300, which is discussed further below with respect to FIG. 3. In general, when an upgrade is being performed, the creation of snapshots may be paused until the upgrade is completed. Providing a system administrator with information on "postponed snapshots" is advantageous because it would enable the system administrator to set up his or her upgrade schedules in a way that is least disruptive to the creation of snapshots.

Figure 2B:
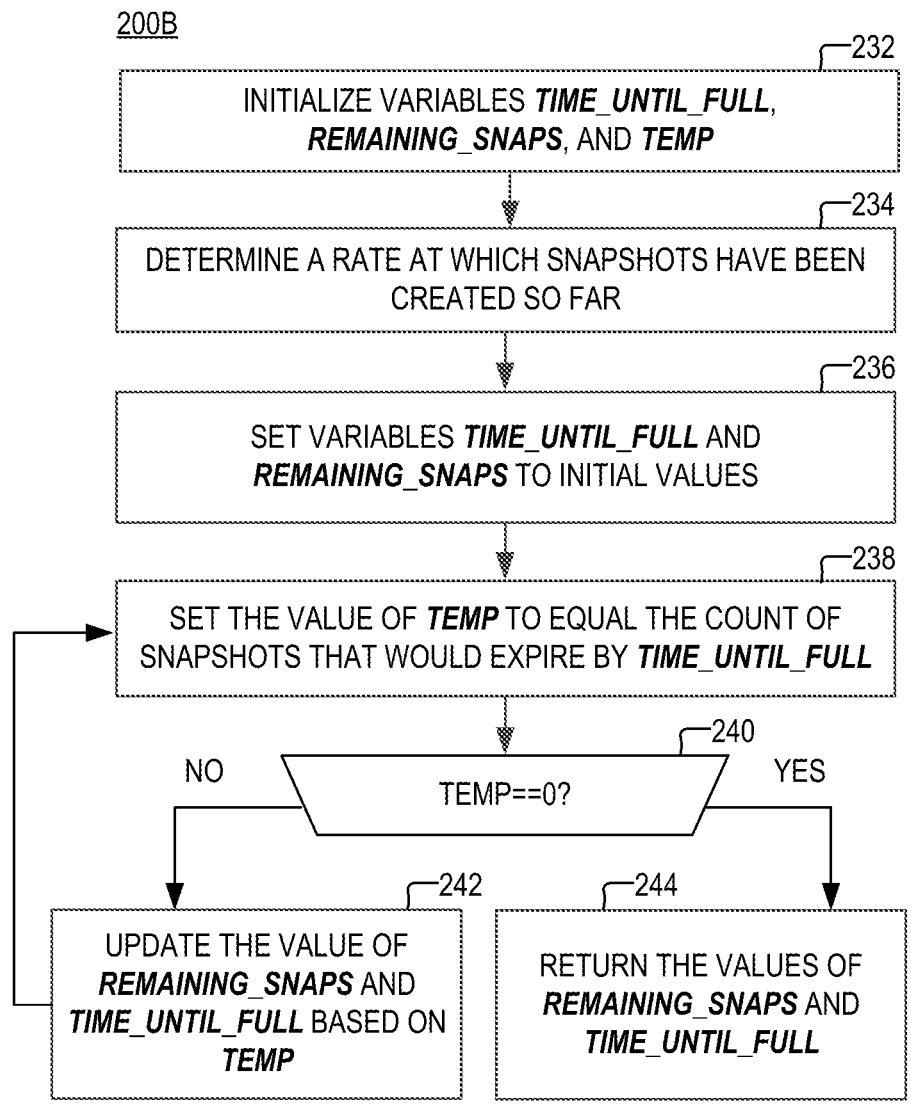
FIG. 2B is a flowchart of an example of a process, according to aspects of the disclosure.

FIG. 2B is a flowchart of an example of a process 200B for determining the time until snapshot storage space 137 becomes full and the number of snapshots that could be stored in snapshot storage space 137 before it becomes full, as specified by step 216 of process 200A.

At step 232, snapshot forecaster 141 initializes variables TIME_UNTIL_FULL, REMAINING_SNAPS, and TEMP. Variable TIME_UNTIL_FULL indicates the amount of remaining time before snapshot storage space 137 becomes full. Variable REMAINING_SNAPS represents the count of snapshots that can be stored in snapshot storage space 137 before it becomes full.

At step 234, snapshot forecaster 141 determines the rate at which snapshots have been created so far. In one example, snapshot forecaster 141 may determine the time for which process 139 have been deployed. This time may equal the duration of the period starting when process 139 was first deployed (or installed in storage system 133) and ending at a current time instant. Next, snapshot forecaster 141 may determine the count of snapshots (e.g., file system, block and storage group snapshots) that are currently stored in snapshot storage space 137. And finally, snapshot forecaster 141 may divide the number of snapshots that are currently stored in snapshot storage space 137 by the time for which process 139 has been deployed to arrive at the rate at which snapshots are created.

At step 236, snapshot forecaster 141 sets TIME_UNTIL_FULL and REMAINING_SNAPS based on the rate (determined at step 234). For example, to determine TIME_UNTIL_FULL, snapshot forecaster 141 may divide the amount of available space in snapshot storage space 137 by the product of the rate at which snapshot are created and the average snapshot size in snapshot storage space 137. Similarly, to determine the value of REMAINING_SNAPS, snapshot forecaster 141 may divide TIME_UNTIL_FULL by the rate that is determined at step 234. As can be readily appreciated, remaining snaps is based on average snapshot size.

At step 238, snapshot forecaster 141 sets the value of TEMP to equal the number of snapshots that have not expired yet, and which would expire before the end of the period specified by TIME_UNTIL_FULL. The term "number snapshots that have not expired yet" refers to the sum of a first count and a second count. The first count is the count of snapshots that are currently stored in snapshot storage space 137 and which are scheduled to expire by TIME_UNTIL_FULL. The second count is the count of snapshots that would be created after the current time instant, and which would expire by TIME_UNTIL_FULL. The first count may be determined (by examining a plurality of snapshot expiration policies to determine the expiration date of each of the snapshots that are currently stored in snapshot storage space 137. The second count may be determined by (i) examining each a the plurality of snapshot creation policies to identify the snapshots that would be created in the period starting at a current time instant and having a duration equal to TIME_UNTIL_FULL, (ii) examining each of the plurality of snapshot expiration policies to determine the expiration date of each of those snapshots, and (iii) determining that count of snapshots whose expiration date is before the end of the period starting at the current time instant and having a duration equal to TIME_UNTIL_FULL. The plurality of snapshot creation policies may include all or fewer than all of the snapshot creation policies that are currently active in storage system 133. The plurality of snapshot expiration policies may include all or fewer than all of the snapshot expiration policies that are currently active in storage system 133.

At step 240, snapshot forecaster 141 determines whether the value of TEMP is equal to zero. If it is equal to zero, process 200B proceeds to step 244. Otherwise, if TEMP is greater than zero, process 200B proceeds to step 242. Although in the present example snapshot forecaster 141 determines whether TEMP is equal to zero, alternative implementations are possible in which snapshot forecaster 141 determines whether TEMP is equal to another predetermined number, such as 1 or 2 for example.

At step 242, snapshot forecaster 141 updates the values of REMAINING_SNAPS and TIME_UNTIL_FULL based on TEMP. The value of REMAINING SNAPS is updated by adding TEMP to it (i.e., REMAINING_SNAPS=REMAINING_SNAPS+TEMP). The value of TIME_UNTIL_FULL is updated by adding to it the value of the quotient of TEMP and the rate determined at step 206 (i.e., TIME_UNTIL_FULL=TIME_UNTIL_FULL+(int)(TEMP/rate)). After step 242 is performed, process 200B returns to step 238.

At step 244, the value of REMAINING_SNAPS and TIME_UNTIL_FULL are returned.

Figure 3:
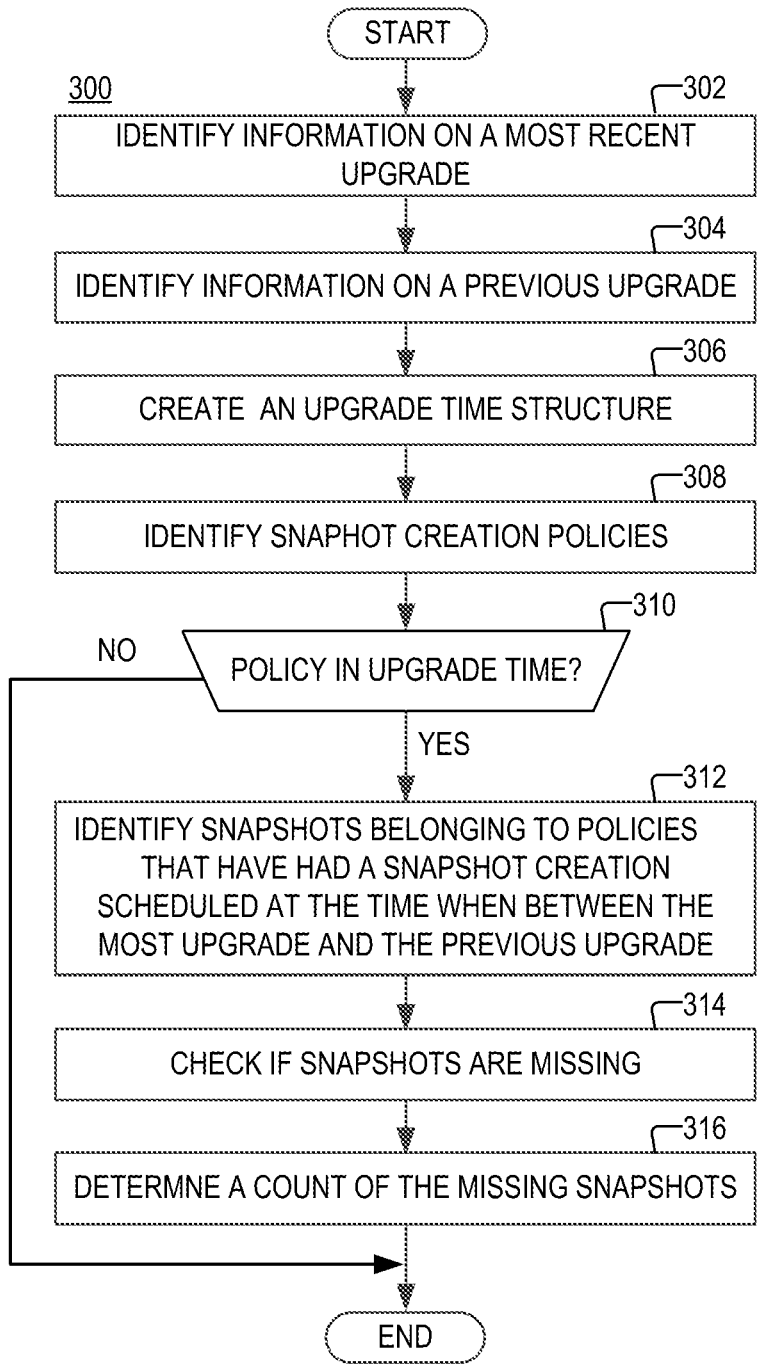
FIG. 3 is a flowchart of an example of a process, according to aspects of the disclosure.

FIG. 3 is a flowchart of an example of a process 300, according to aspects of the disclosure.

At step 302, snapshot forecaster 141 identifies information associated with a most recent upgrade. In one example, the information on the most recent upgrade may include an upgrade policy (or upgrade configuration file) that is used to perform the most recent upgrade. The identified information may identify the time when the most recent upgrade started and/or how long it took to complete. As used throughout the disclosure, the term upgrade policy refers to a rule that determines when an upgrade is going to be performed and/or on what files. In some implementations, the upgrade policies may prescribe upgrades (e.g., modifications) on executable files that are executed by storage system 133 for the purposes of creating, expiring, and/or otherwise managing snapshots.

At step 304, snapshot forecaster 141 identifies information associated with a previous upgrade. According to the present example, the previous upgrade includes the upgrade that was performed immediately before the most recent upgrade. However, alternative implementations are possible in which the previous upgrade includes any upgrade that was performed before the most recent upgrade. In one example, the information on the previous upgrade may include an upgrade policy (or upgrade configuration file) that is used to perform the previous upgrade. The identified information may identify the time when the most recent upgrade started and/or how long it took to complete.

At step 306, snapshot forecaster 141 creates an upgrade time structure. The upgrade time structure may include a data structure that specifies a period starting when the previous upgrade was started and ending when the current upgrade was completed (or started). This period is herein referred to as an "upgrade period".

At step 308, snapshot forecaster 141 identifies a plurality of snapshot creation policies. The plurality of snapshot creation policies may include all or fewer than all of the snapshot creation policies that are currently active in storage system 133.

At step 310, snapshot forecaster 141 detects whether the snapshot creation policies provide that one or more snapshots had to be created during the upgrade period. If no snapshots were required to be created during the upgrade period, process 300 ends. Otherwise, process 300 proceeds to step 312.

At step 312, snapshot forecaster 141 identifies snapshots that are created under the snapshot creation policies (identified at step 308) during the upgrade period.

At step 314, snapshot forecaster 141 detects whether the identified set of snapshots contains fewer snapshots than the snapshots that were supposed to be created. In other words, snapshot forecaster 141 detects whether each snapshot that is required to have been created by the identified snapshot policies is present in snapshot storage space 137 (provided that no expiration policy requires the snapshot to be deleted before the end of the upgrade period).

At step 316, snapshot forecaster 141 determines the count of snapshots that were postponed. In other words, snapshot forecaster 141 determines the count of snapshots that were required to be created by the snapshot creation policies during the upgrade period, but which are nevertheless missing from snapshot storage space 137.

Figure 4A:
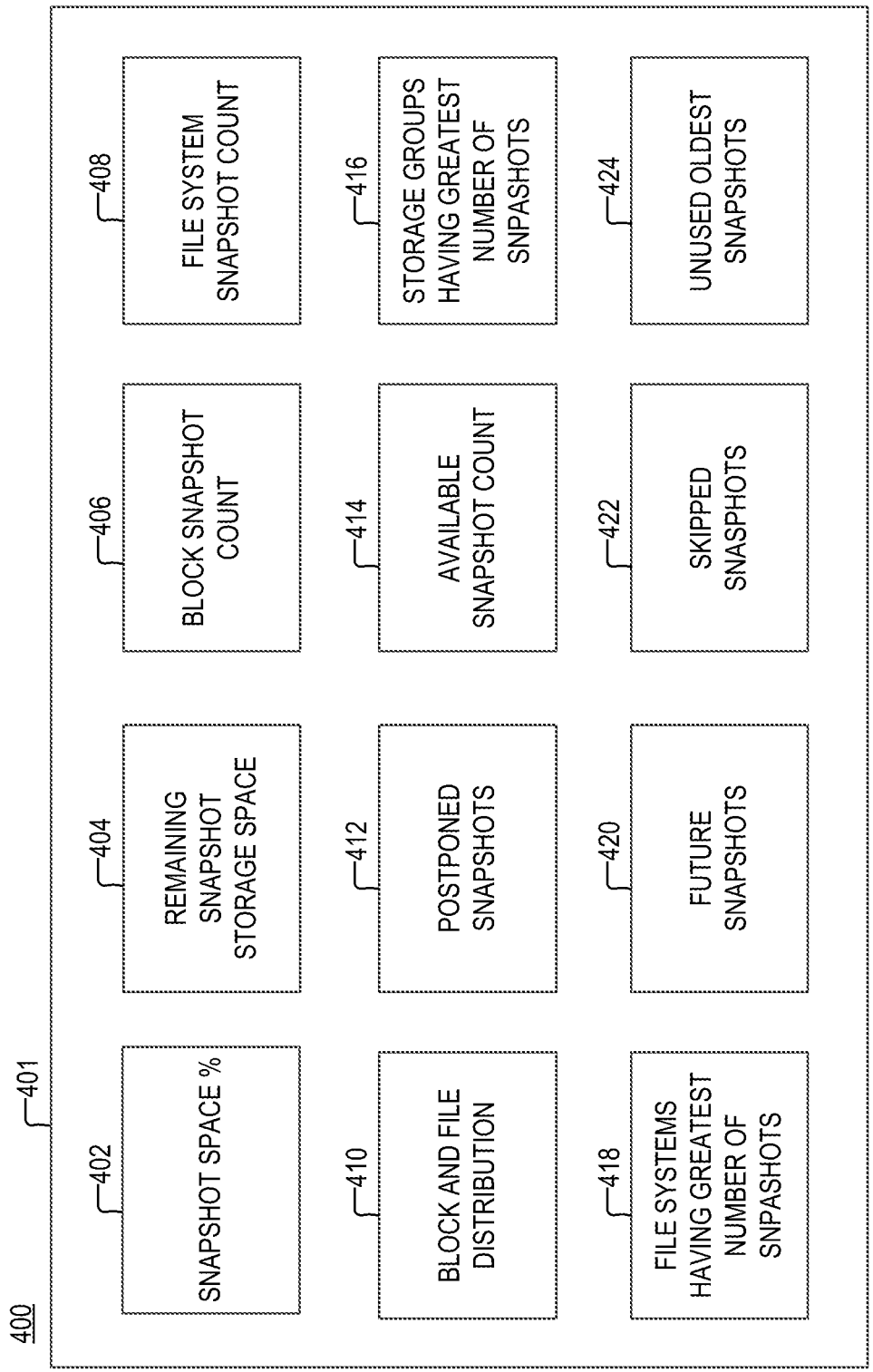
FIG. 4A is a diagram of an example of a user interface, according to aspects of the disclosure.

FIG. 4A is a schematic diagram of an example of UI 400 of the snapshot forecaster 141, according to aspects of the disclosure. In one example, UI 400 may display any of the information that is obtained in any of the processes discussed above with respect to FIGS. 2A, 2B, and 3.

Additionally or alternatively, in one example, UI 400 may include a screen 401. Screen 401 may include input components 402-424. Input components 402-424 may include buttons, menu options, checkboxes, and/or any other suitable type of input component.

When input component 402 is activated (e.g., pressed), UI 400 may display an indication of the total used space in snapshot storage space 137. When input component 404 is activated (e.g., pressed), UI 400 may display an indication of the total remaining space in snapshot storage space 137. When input component 406 is activated (e.g., pressed), UI 400 may display an indication of the count of block snapshots that are stored in snapshot storage space 137. When input component 408 is activated (e.g., pressed), UI 400 may display an indication of the count of file system snapshots that are stored in snapshot storage space 137. When input component 406 is activated (e.g., pressed), UI 400 may display an indication of the count of file system snapshots that are stored in snapshot storage space 137. Any of the information displayed in response to input components 402-408 being activated may be information obtained at step 202 (and/or step 203) of process 200A (shown in FIG. 2A).

When input component 410 is activated (e.g., pressed), UI 400 may display the snapshot distribution calculated at step 204 of process 200A. When input component 412 is activated (e.g., pressed), UI 400 may display a count of postponed snapshots (determined by process 300, which is shown in FIG. 3). When input component 414 is activated (e.g., pressed), UI 400 may display a count of the snapshots that are currently stored in snapshot storage space 137. This information may be determined as a result of executing process 200A. When input component 416 is activated (e.g., pressed), UI 400 may display an indication of the storage groups having the greatest number of snapshots. For example, UI 400 may display the information determined at step 206 or process 200A. When input component 418 is activated (e.g., pressed), UI 400 may display an indication of the file systems with the most snapshots. For example, UI 400 may determine the information determined at step 208 of process 200A.

Each of the snapshot management metrics discussed with respect to input components 402-420 is based on information associated with one or more snapshots that are currently stored in snapshot storage space 137. In some implementations, when any of input components 402-420 is activated, UI 400 may display a plurality of tabs, wherein each tab contains information about a different one of the snapshots that are used in calculating the snapshot management metric that corresponds to the input component.

When input component 420 is activated (e.g., pressed), UI 400 may display a count of snapshots that are expected to be created in the future. In one example, the UI may display a count of upcoming snapshots (determined at step 210). Additionally or alternatively, UI 400 may display the count of remaining snapshots (determined at step 216). For example, UI 400 may display the value of REMAINING_SNAPS that is returned by process 200B (shown in FIG. 200B) or any of the information that is obtained for the purposes of executing the process 200B. Alternatively, UI 400 may individually list each of the snapshots that are expected to be created during a predetermined (future) time period. The time period may be the same as the period discussed with respect to step 210 (e.g., an immediate time period) or it may be a time period starting at a current or past time instant and ending when snapshot storage space is full (i.e., a period specified by the value of TIME_UNTIL_FULL which is discussed above with respect to FIG. 2B). In another example, UI 400 may display a plurality of tabs, wherein each tab contains information about a different one of the future snapshots (i.e., the snapshots that are expected during the predetermined time period). Each tab may identify the time when the snapshot is expected to be created, the body of blocks or file system of which the snapshot is a (partial) copy, and/or any other suitable information.

When input component 422 is activated (e.g., pressed), snapshot forecaster 141 may display a count of skipped snapshots. For example, UI 400 may display any of the information obtained at step 212 of process 200A. In some implementations, UI 400 may individually list each of the snapshots that have been skipped. In another example, UI 400 may display a plurality of tabs, wherein each tab contains information about a different one of the skipped snapshots. Each tab may identify the time when the snapshot was supposed to be created, the body of blocks or file system of which the snapshot was supposed to be a (partial) copy, and/or any other suitable information.

When input component 424 is activated (e.g., pressed), snapshot forecaster 141 may display an indication of the unused oldest snapshots in snapshot storage space 137. For example, UI 400 may display any of the information obtained at step 214 of process 200A. In some implementations, UI 400 may individually list each of the unused oldest snapshots. In another example, UI 400 may display a plurality of tabs, wherein each tab contains information about a different one of the unused oldest snapshots. Each tab may identify the time when the snapshot is expected to be created, the body of blocks or file system of which the snapshot is a (partial) copy, and/or any other suitable information.

Figure 4B:
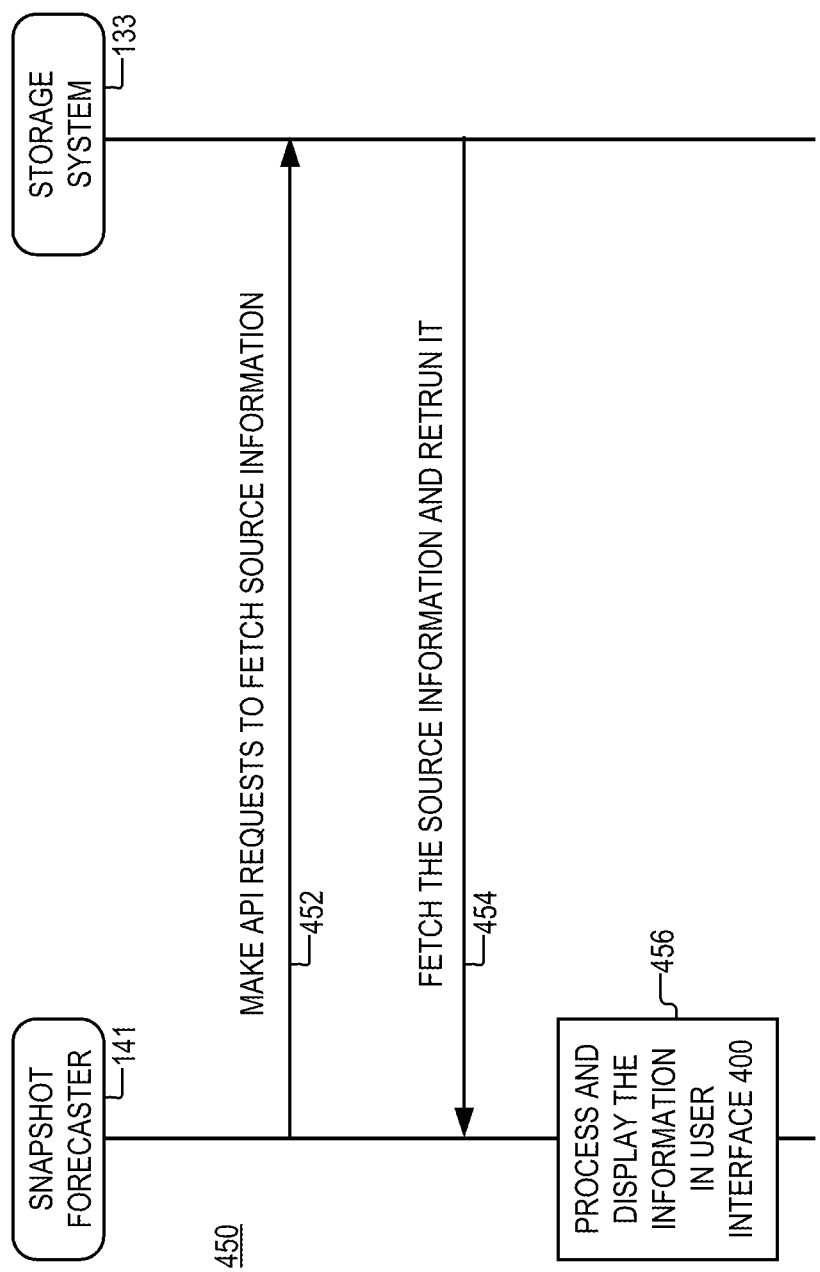
FIG. 4B is a sequence diagram of an example of a process, according to aspects of the disclosure.

FIG. 4B is a sequence diagram of a process 450 that is performed by snapshot forecaster 141. At step 452, snapshot forecaster 141 places API calls to obtain source information. The called APIs may be provided by base platform 131. At step 454, storage system 133 executes the API calls and returns the requested information. At step 456, snapshot forecaster 141 processes the received information to derive additional information and displays all (or at least some) of the received and/or derived information in UI 400. The displayed information may include any of the information that is described as being obtained or derived in the discussion of FIGS. 2A, 2B, and 3. In one respect, FIG. 4B is provided to illustrate the general pattern of interaction between snapshot forecaster 141 and storage system 133 to facilitate the presentation of information (in UI 400) that is relevant to the management of the snapshot storage space 137 and/or the generation of snapshots in storage system 133. In some implementations process 200A or portion thereof may be performed by storage system 133. In such implementations, storage system 133 (or base platform 131) may perform the necessary processing to derive any of the information items determined at steps 203-218, and snapshot forecaster 141 may only output information that is provided by storage system 133 without performing any processing. Or alternatively, in some implementations, the information processing may be split between storage system 133 and snapshot forecaster 141. Stated succinctly, the present disclosure is not limited to any specific division of tasks between storage system 133 and snapshot forecaster 141.

Referring to FIG. 5, in some embodiments, a device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

FIGS. 1-5 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer. (11/17)

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:
retrieving, by a snapshot management tool, a plurality of snapshot creation policies, each of the plurality of snapshot creation policies including one or more rules that specify when or under what circumstances a snapshot associated with the snapshot creation policy should be created;
retrieving, by the snapshot management tool, a plurality of snapshot expiration policies, each of the expiration policies including one or more rules that specify when or under what circumstances a snapshot associated with the snapshot expiration policy should be deleted;
receiving, by the snapshot management tool, a user input that specifies a period of interest;
processing, by the snapshot management tool, the plurality of snapshot creation policies to identify a first count of snapshots that were required to be created during the period of interest by any of the plurality of snapshot creation policies;
processing, by the snapshot management tool, the plurality of snapshot creation policies and the plurality of the snapshot expiration policies to identify a second count of snapshots that were required to be created during the period of interested by any of the plurality of snapshot creation policies, and which were required to be deleted during the period of interest by any of the plurality of snapshot expiration policies;
identifying, by the snapshot management tool, a third count of snapshots that are currently present in the storage system and which were created based on the plurality of snapshot creation policies during the period of interest;
identifying, by the snapshot management tool, a count of missing snapshots based on the first count, the second count, and the third count, each of the missing snapshots being a snapshot that was required to be created by the plurality of snapshot creation policies, but which failed to be created; and
displaying an indication of the count of missing snapshots in a graphical user interface of the snapshot management tool.

2. The method of claim 1, wherein the plurality of snapshot creation policies includes only active snapshot creation policies, and the plurality of snapshot expiration policies includes only active snapshot expiration policies.

3. The method of claim 1, wherein the plurality of snapshot creation policies includes one or more snapshot creation policies that are associated with file system snapshots, one or more snapshot creation policies that are associated with block snapshots, and one or more snapshot creation policies that are associated with storage group snapshots.

4. The method of claim 1, wherein the missing snapshots include snapshots that were not created due to one or more of a hardware failure, a software failure, and a system overload.

5. The method of claim 1, wherein the period of interested ends at a past time instant.

6. The method of claim 1, further comprising, displaying, in the graphical user interface, a list of the missing snapshots.

7. The method of claim 6, wherein displaying the list of the missing snapshots includes displaying a plurality of tabs, wherein each tab includes information associated with a different one of the missing snapshots.

8. The method of claim 1, wherein the plurality of a snapshot creation policies and the plurality of snapshot expiration policies are retrieved by placing one or more application programming interface (API) calls to a base platform that is part of the storage system.

9. A system, comprising:
a memory; and
at least one processor that is operatively coupled to the memory, the at least one processor being configured to perform the operations of:
retrieving, by a snapshot management tool, a plurality of snapshot creation policies of a storage system, each of the plurality of snapshot creation policies including one or more rules that specify when or under what circumstances a snapshot associated with the snapshot creation policy should be created;
retrieving, by the snapshot management tool, a plurality of snapshot expiration policies of the storage system, each of the snapshot expiration policies including one or more rules that specify when or under what circumstances a snapshot associated with the snapshot expiration policy should be deleted,
receiving, by the snapshot management tool, a user input that specifies a period of interest;
processing, by the snapshot management tool, the plurality of snapshot creation policies to identify a first count of snapshots that were required to be created during the period of interest by any of the plurality of snapshot creation policies;
processing, by the snapshot management tool, the plurality of snapshot creation policies and the plurality of snapshot expiration policies to identify a second count of snapshots that were required to be created during the period of interest by any of the plurality of snapshot creation policies, and which were required to be deleted during the period of interest by any of the plurality of snapshot expiration policies;
identifying, by the snapshot management tool, a third count of snapshots that are currently present in the storage system and which were created based on the plurality of snapshot creation policies during the period of interest;
identifying, by the snapshot management tool, a count of missing snapshots based on the first count, the second count, and the third count, each of the missing snapshots being a snapshot that was required to be created by the plurality of snapshot creation policies, but which failed to be created; and
displaying an indication of the count of missing snapshots in a graphical user interface of the snapshot management tool.

10. The system of claim 9, where the plurality of snapshot creation policies includes only active snapshot creation policies, and the plurality of snapshot expiration policies includes only active snapshot expiration policies.

11. The system of claim 9, wherein the plurality of snapshot creation policies includes one or more snapshot creation policies that are associated with file system snapshots, one or more snapshot creation policies that are associated with block snapshots, and one or more snapshot creation policies that are associated with store group snapshots.

12. The system of claim 9, wherein the missing snapshots include snapshots that were not created due to one or more of a hardware failure, a software failure, and a system overload.

13. The system of claim 9, wherein the period of interest ends at a past time instant.

14. The system of claim 9, wherein, the at least one processor is further configured to perform the operation of displaying, in the graphical user interface, a list of the missing snapshots.

15. The system of claim 14, wherein displaying the list of the missing snapshots includes displaying a plurality of tabs, wherein each tab includes information associated with a different one of the missing snapshots.

16. The system of claim 9, wherein the plurality of a snapshot creation policies and the plurality of snapshot expiration policies are retrieved by placing one or more application programming interface (API) calls to a base platform that is part of the storage system.

17. A non-transitory computer-readable medium storing one or more processor-executable instructions, which, when executed by one or more processors, cause the one or more processors to perform the operations of:
 retrieving, by a snapshot management tool, a plurality of snapshot creation policies of a storage system, each of the plurality of snapshot creation policies including one or more rules that specify when or under what circumstances a snapshot associated with the snapshot creation policy should be created;
 retrieving, by the snapshot management tool, a plurality of snapshot expiration policies of a storage system, each of the snapshot expiration policies including one or more rules that specify when or under what circumstances a snapshot associated with the snapshot expiration policy should be deleted;
 receiving, by the snapshot management tool, a user input that specifies a period of interest;
 processing, by the snapshot management tool, the plurality of snapshot creation policies to identify a first count of snapshots that were required to be created during the period of interest by any of the plurality of snapshot creation policies;
 processing, by the snapshot management tool, the plurality of snapshot creation policies and the plurality of snapshot expiration policies to identify a second count of snapshots that were required to be created during the period of interest by any of the plurality of snapshot creation policies, and which were required to be deleted during the period of interest by any of the plurality of snapshot expiration policies;
 identifying, by the snapshot management tool, a third count of snapshots that are currently present in the storage system and which were created based on the plurality of snapshot creation policies during the period of interest;
 identifying, by the snapshot management tool, a count of missing snapshots based on the first count, the second count, and the third count, each of the missing snapshots being a snapshot that was required to be created by the plurality of snapshot creation policies, but which failed to be created; and
 displaying, by the snapshot management tool, an indication of the count of missing snapshots in a graphical user interface of the snapshot management tool.

18. The nontransitory computer-readable medium of claim 17, wherein the plurality of snapshot creation policies includes only active snapshot creation policies, and the plurality of snapshot expiration policies includes only active snapshot expiration policies.

19. The non-transitory computer-readable medium of claim 17, wherein the plurality of snapshot creation policies includes one or more snapshot creation policies that are associated with file system snapshots, one or more snapshot creation policies that are associated with block snapshots, and one or more snapshot creation policies that are associated with storage group snapshots.

20. The non-transitory computer-readable medium of claim 17, wherein the missing snapshots include snapshots that were not created due to one or more of a hardware failure, a software failure, and a system overload.

* * * * *